May 5, 1936.  W. G. TENNEY  2,039,669
BATTERY TERMINAL
Filed April 30, 1934
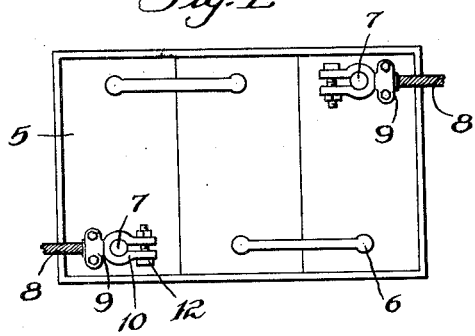
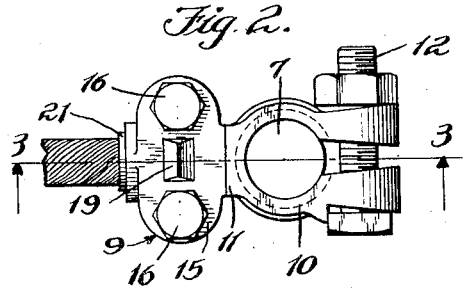
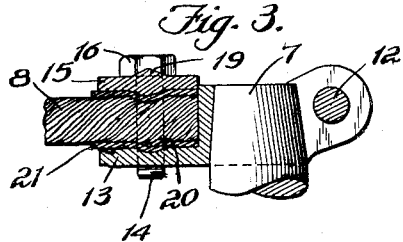
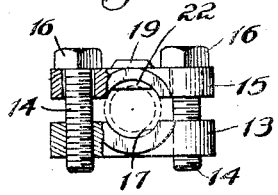
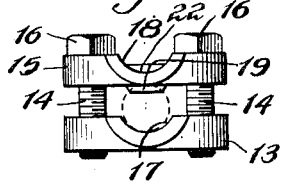
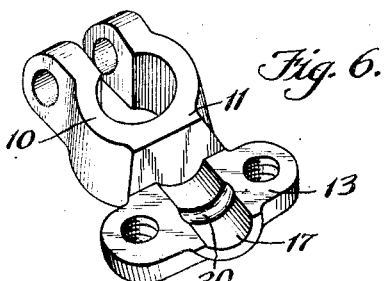
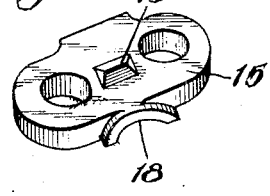
INVENTOR.
William G. Tenney
BY E. J. Andrews
ATTORNEY.

Patented May 5, 1936

2,039,669

UNITED STATES PATENT OFFICE 2,039,669

BATTERY TERMINAL

William G. Tenney, Chicago, Ill.

Application April 30, 1934, Serial No. 723,145

2 Claims. (Cl. 173—259)

This invention relates to battery terminals, and has for its object providing a suitable terminal to which wires or cables may be easily connected; and particularly terminals of storage batteries which deposit chemicals on the terminals which interferes with connecting or disconnecting the cables.

Of the accompanying drawing, Fig. 1 is a plan view of a storage battery showing terminals which embody features of my invention; Fig. 2 is an enlarged plan view of one of the terminals; Fig. 3 is a sectional view along the line 3—3 of Fig. 2; Fig. 4 is an end view of the terminal, partly in section; Fig. 5 is an end view of the terminal arranged for small cables; Fig. 6 is an enlarged perspective view of the connector of the terminal; and Fig. 7 is a similar view of another portion of the connector.

I refer to my invention as a battery terminal, and not merely a cable connector, as the connecting means is a permanent part of the battery terminal, and need not be removed therefrom during the life of the battery, as the cable is always connected to or disconnected from the connector portion of the battery terminal. In this way the cable making and breaking point is spaced away from the battery post, and the deposit from the battery must travel farther to be seriously objectionable. Also I am in this way able to shape each of the connecting elements most desirably for carrying out its function and each element can be made out of material best suited for its purpose.

Fig. 1 illustrates a storage battery 5 composed of three cells having cell posts 6 connecting the cells, and posts 7 to which are indirectly connected the cables 8 by means of the connectors 9 of the terminals. The connector may be fixed to the battery post in any suitable manner. As illustrated the connector is fixed to the post by means of yoke-shaped arms 10 fixed to the body 11 of the connector and clamped onto the cell post 7 by means of a bolt 12.

The connector portion of the terminal comprises the body 11, to which is fixed a lug 13, into which are threaded two cap screws 14. These screws pass through a loose clamping strap 15, and the cable 8 is tightly clamped between the lug and the strap by means of the cap screws 14.

By this arrangement the connecting portion of the terminal is entirely independent of the battery post 7, and may be permanently soldered to the post if desired. Also the heads 16 of the cap screws project upwardly where they are easily operated, and as they are threaded directly into the lug 13 they may be readily entirely removed upwardly, or merely loosened sufficiently to remove the cable. If a deposit has formed on the connector, an ordinary wrench will readily loosen the screws, and when the screws are removed or loosened the cable may be easily loosened from the lug and strap.

The connecting means as described hereinabove ordinarily provide ample means for the purpose. But I prefer to provide arcuate surfaces 17 and 18 in the lug and strap so as to more snugly clasp the cable. And a projection 22, and a corresponding groove 20, may be provided. These provide means for more firmly clasping the cable, as the projection presses into the cable and the cable is pressed somewhat into the groove. I also provide a soft metal sleeve 21 which may be slipped over the cable end so as to make an even more perfect electrical connection, as the soft metal, preferably lead, is pressed into the cable interstices and leaves no cavities for the accumulation of corrosive substances.

If it is desired to connect smaller cables, the strap 15 may be inverted, as shown in Fig. 5, putting the straight side down, so that the clamping space between the strap and lug is materially reduced. Or, if the cable end, by frequent disconnections, becomes reduced in size too much to be firmly held by the normal arrangement, the strap may be inverted and the connection made without any inconvenience. A projection 19 assists in making a firm connection.

It will be understood that one feature of my invention is dispensing with nuts for the cable clamping bolts or screws. This does away with the likelihood of the bolts turning as the nuts are being unscrewed, and it allows the bolts to be readily entirely removed from the lug, if desired.

I claim as my invention:

1. A battery terminal, comprising a body having a battery post attaching portion and a cable attaching portion, said cable attaching portion comprising a rigid horizontal extension of said post attaching portion, a reversible clamping strap having a vertically extending projection on each of the opposite faces thereof adapted to selectively cooperate with means on said cable attaching portion for positively connecting thereto cables of differing dimensions, and means for positioning and securing said strap to said cable attaching portion with cable connecting means thereof in cooperating relationship.

2. A battery terminal, comprising a body having a battery post connector and a lug projecting horizontally from the body, a reversible clamping strap, spaced means passing through said strap and threaded into said lug for positioning and securing the strap on said lug, said strap and lug having concaved opposing face portions and cable gripping means extending transversely of said concaved face portions, and said strap having a transversely extending tapering projection on a face opposite its concaved face adapted to be selectively secured in cooperative relation with the concaved face of said lug.

WILLIAM G. TENNEY.